United States Patent [19]

Becker et al.

[11] Patent Number: 4,617,362

[45] Date of Patent: Oct. 14, 1986

[54] INVERSE EMULSION POLYMERS WITH IMPROVED INCORPORATION OF DIALLYLDIMETHYLAMMONIUM CHLORIDE

[75] Inventors: Larry W. Becker; Eric H. Larson, both of Marcellus, N.Y.

[73] Assignee: Allied Corporation, Morris Township, Morris County, N.J.

[21] Appl. No.: 734,436

[22] Filed: May 16, 1985

Related U.S. Application Data

[63] Continuation-in-part of Ser. No. 687,700, Dec. 31, 1984, abandoned.

[51] Int. Cl.$^4$ .............................................. C08F 2/32
[52] U.S. Cl. ................................. 526/209; 526/207; 526/210; 526/215; 526/220; 526/287; 526/292.2; 526/307
[58] Field of Search ............... 526/207, 209, 210, 215, 526/220

[56] References Cited

U.S. PATENT DOCUMENTS 3,284,393 11/1966 Vanderhoff .......................... 526/287
3,767,629 10/1973 Vallino, Jr. ........................... 526/287
4,396,752 8/1983 Cabestany et al. ................. 526/287

Primary Examiner—Christopher Henderson
Attorney, Agent, or Firm—Arthur J. Plantamura; Jay P. Friedenson

[57] ABSTRACT

The present invention provides a process for improved incorporation of diallyldimethylammonium chloride (DADMAC) into an acrylamide polymer. This invention makes use of a copolymerizable promoter monomer. Also provided by the present invention are inverse emulsion terpolymers of diallyldimethylammonium chloride. The improved incorporation resides in the use of a promoter monomer that is more reactive with acrylamide than is the DADMAC monomer and is selected from

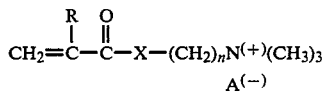

wherein
R is —H or $CH_3$;
X is —O—, or —NH—;
n has a value of 2–4; and
A is an ion selected from the group consisting of $Cl^-$, $CH_3SO_4^-$, $HSO_4^-$ and $NO_3^-$.

Specific monomers within this formula included, for example, 2-methacryloylethyltrimethylammonium chloride and 2-acryloylethyltrimethylammonium chloride.

Typical of such promoter monomers are 2-methacryloylethyl trimethyl ammonium chloride and 2-acryloylethyl trimethyl ammonium chloride.

7 Claims, No Drawings

INVERSE EMULSION POLYMERS WITH IMPROVED INCORPORATION OF DIALLYLDIMETHYLAMMONIUM CHLORIDE

This application is a continuation-in-part application of Ser. No. 687,700 filed on Dec. 31, 1984 now abandoned.

TECHNICAL FIELD

This invention is related to a process for improved incorporation of diallyldimethylammonium chloride into an acrylamide polymer, and to the inverse emulsions produced.

BACKGROUND ART

As illustrated by Example 34 of U.S. Pat. No. 4,077,930 to Lim, et al., a self-inverting emulsion having a viscosity of 2000 cps and containing a polymer derived from acrylamide, diallyldimethylammonium chloride (DADMAC) and 2-methacryloylethyltrimethyl ammonium methosulfate, is known. This emulsion is produced by a polymerization procedure in the presence of a high HLB emulsifier.

One of the major problems in acrylamide, diallyldimethylammonium chloride polymerizations is incomplete incorporation of the latter, i.e. of the DADMAC monomer into the acrylamide polymer. This is due to the fact that acrylamide is considerably more reactive than DADMAC, and therefore tends to self-polymerize rather than react with the cationic monomer. As a result, one or more of the following results: the DADMAC monomer is wasted; it is difficult to predict the composition of the polymer; and/or undesireable charge distributions result. Accordingly, there is an apparent need for a process for effecting an improved incorporation of DADMAC into an acrylamide polymer. An improved process of this kind would be particularly beneficial because it would produce an inverse emulsion polymer of DADMAC of increased viscosity and improved stability. Furthermore, when prepared by the procedure disclosed in the Lim, et al. U.S. Pat. No. 4,077,930, a typical emulsion is relatively unstable, having about 5-6% v/v oil separation and about 5-10% v/v cream after one month at 50° C. Therefore, a process that is capable of yielding an increased DADMAC incorporation would be especially useful if it also produced an inverse emulsion polymer having a very high degree of thermal stability. For example, less than 2% v/v oil separation and less than 2% v/v cream after one month at 50° C. Also it is beneficial to keep the product viscosity below 1000 cps.

SUMMARY OF THE INVENTION

It is accordingly an object of the present invention to provide a process for improved incorporation of diallyldimethylammonium chloride into an acrylamide polymer.

It is a further object of the present invention to provide an inverse emulsion polymer of diallyldimethylammonium chloride with good end use performance and with a viscosity within commercially attractive limits.

It is still a further object of the invention to provide an inverse emulsion polymer of diallyldimethylammonium chloride having a very high degree of thermal stability.

Additional objects, advantages and novel features of the present invention are set forth in the description that follows, and in part will become apparent to those skilled in the art upon examination of the following description or may be learned by practice of the invention.

To achieve the foregoing objects and in accordance with the purpose of the present invention, as embodied and broadly described herein, there is provided a process for improved incorporation of diallyldimethylammonium chloride into an acrylamide polymer. The process includes the step of polymerizing in an aqueous medium the DADMAC and acrylamide in the presence of a copolymerizable monomer having a higher reactivity than DADMAC with acrylamide. The aqueous polymerization medium contemplates emulsion or solution polymerization systems, although an emulsion system is preferred. The copolymerizable monomer selected from the group consisting of a monomer of the general formula:

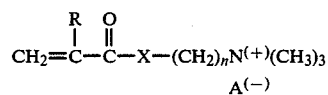

wherein
R is —H or $CH_3$;
X is —O—, or —NH—;
n has a value of 2-4; and
A is an ion selected from the group consisting of $Cl^-$, $CH_3SO_4^-$, $HSO_4^-$ and $NO_3^-$ Specific monomers within this formula include, for example, 2-methacryloylethyltrimethylammonium chloride and 2-acryloylethyltrimethylammonium chloride. The monomer of the general formula is present in an amount sufficient to provide improved incorporation of DADMAC into the acrylamide polymer. The polymerizing step is carried out in the presence of emulsifiers that provides a suitable HLB and preferably an HLB of not more than about 8.

The amount of the copolymerizable monomer is sufficient to provide improved incorporation of DADMAC into the acrylamide polymer. Generally, an additional amount of between about 0.1 to about 50 mole percent of the monomer is used based on the total moles of DADDMAC.

DESCRIPTION OF THE PREFERRED EMBODIMENT

By the present invention, the incorporation of diallyldimethylammonium chloride into an acrylamide polymer is substantially improved. The improved incorporation is attained by polymerizing the diallyldimethylammonium chloride monomer with the acrylamide monomer in the presence of a promoter monomer which is more reactive with acrylamide than is the DADMAC monomer. The promoter monomer is selected from the group consisting of those compounds of the general formula:

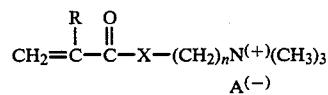

wherein
R is —H or $CH_3$;
X is —O—, or —NH—;
n has a value of 2-4; and

A is an ion selected from the group consisting of Cl⁻, $CH_3SO_4^-$ $HSO_4^-$ and $NO_3^-$.

Specific monomers within this formula included, for example, 2-methacryloylethyltrimethylammonium chloride and 2-acryloylethyltrimethylammonium chloride. By "improved incorporation" of the DADMAC, for purposes of the present invention, is meant that the invention results in the incorporation of a percentage of DADMAC into an acrylamide polymer, that is higher than would be obtained in the absence of the promoter monomer.

The invention provides an inverse emulsion copolymer of DADMAC that inverts well and, as a consequence, rapidly releases the polymer into the water to perform its function. The DADMAC copolymer of the invention has a viscosity within commercially acceptable limits and a very high degree of thermal stability.

In the formation of the copolymer of the invention, about 10–99 mole % acrylamide is typically polymerized with about 1–50 mole % DADMAC. In the disclosure of the inventive concept expressed herein, the term "acrylamide" as used herein, include methacrylamide, substituted acrylamides and substituted methacrylamides.

It is an essential feature of the invention that polymerization of acrylamide and DADMAC be in the presence of a copolymerizable promoter monomer whose reactivity with DADMAC is greater than it is with acrylamide and is selected from compounds represented by the above general formula. We have discovered that such promoter comonomers promote a definite improvement in the incorporation of the DADMAC. Various additional monomers which are generally compatible with the copolymer system may be contained with the polymerizable system of the invention of acrylamide, DADMAC and the active promoter comonomers. Illustrative of such additional monomers are: cationic monomers such as quaternary $C_1$–$C_{18}$ alkyl esters of acrylic acid, or methacrylic acid, quaternary substituted acrylamides and quaternary substituted methacrylamides. Also useful are nonionic and anionic monomers such as styrene, alphamethtyl styrene, acrylonitrile, methacrylonitrile, 2-acrylamidopropane-2-sulfonic acid, acrylic acid, methacrylic acid, maleic and fumaric acids and esters, functional group-containing acrylates and methacrylates such as hydroxyethylacrylate and vinyl acetate.

For use in water treatment, the cationic monomer is highly advantageous, as it contributes to the charge generally desired for this type of end use. The exemplary cationic monomers comprise 2-methacryloylethyltrimethylammonium chloride, and 2-acryloylethyltrimethylammoinum chloride. Referring to Table 1 of U.S. Pat. No. 4,396,752, the reactivity ratios ($r^2$:$r^1$) for these two cationic monomers are as follows: acrylamide, $r^1$=0.2, and 2-methacryloylethyltrimethylammonium chloride, $r^2$=1.75 ($r^2$:$r^1$=8.75:1); acrylamide, $r^1$=0.72, and 2-acryloylethyltrimethylammonium chloride, $r^2$=0.66 ($r^2$:$r^1$=0.92:1). A ratio of 8.75:1 means that 2-methacryloylethyltrimethylammonium chloride is 8.75 times less reactive than acrylamide. Comparison with the reactivity ratio for 2-acryloylethyltrimethylammonium chloride shows that there is a substantial greater reactivity of these monomers with acrylamide.

As illustrated with 2-methacryloylethyltrimethylammonium chloride and 2-acryloylethyltrimethylammonium chloride, copolymerizable monomers having a reactivity ratio in the range of about 8.75–0.92:1 are useful as promoters in the presents invention. However, a copolymerizable monomer not within this range may also be useful, provided that it is more reactive than DADMAC with acrylamide. Essentially, the copolymerizable monomers are sufficiently more reactive than DADMAC with acrylamide such, that they provide improved incorporation of DADMAC into the acrylamide polymer.

The promoter monomer of the general formula will typically be used in an amount that is economical yet effective. Generally, about 0.1 to 40 mole % of the promoter monomer, based upon total moles of the DADMAC monomer, provides improved incorporation of DADMAC into an acrylamide polymer. The proper dosage will depend upon factors including the particular monomer selected for use as the promoter, and the amount of DADMAc. As the amount of DADMAC is increased, it is generally beneficial to increase the amount of promoter monomer. Furthermore, increasing amounts of promoter monomer typically result in increased DADMAC incorporation. While the dosage of promoter monomer required to provide improved incorporation of DADMAC into an acrylamide polymer cannot be predicted with certainty in every instance, a dosage within the above limits can be determined with simple experimentation.

A further essential feature of the present invention is that the polymerization be carried out in an aqueous polymerization medium which is preferably an emulsion polymerization system, but includes, as well, solution polymerization. When emulsion polymerization isused, the one or a combination of surfactants that provide a suitable HLB, preferably an HLB of not more than about 8 are used. Surfactants of this type are well known, and for example, may comprise a mixture of sorbitan monooleate sorbitan trioleate and ethoxylated 12-hydroxystearic acid, such that the mixture has an HLB of 5.5. It will be understood that a single emulsifier could be used, rather than a combination of surfactants, so long as a suitable HLB is obtained.

In the practice of this invention, the procedure used to prepare an inverse emulsion in accordance with the present invention, is for the most part conventional. Therefore, the typical procedure now described is particularly intended to highlight those features that are novel.

A conventional inert hydrophobic liquid such as isoparaffinic oil, is mixed with certain conventional emulsifiers, and the resulting oil phase is homogenized. Afterwards, the emulsified oil phase is mixed with a solution of acrylamide, DADMAC and the promoter monomer, and the mixture is homogenized until about 90% of the droplets are between less than 5 microns in size.

The resulting water-in-oil emulsion is sparged with nitrogen to remove oxygen, and polymerization is inducted, conveniently by the addition of a conventional free radical initiator useful in emulsion polymerization. Exemplary initiators of this type include peroxyester initiators such as t-butylperoxypivalate.

Polymerization is generally carried out at a reaction temperature in the range of about 35°–55° C., advantageously at a temperature in the range of about 40°–45° C. A reaction temperature of about 60° C. will generally be an upper limit for a polymerization that forms an inverse emulsion. Polymerization is continued until less than about 1% acrylamide is present, thereafter a suitable high HLB surfactant, such as ethoxylated octylphenol, ethoxylated oleyl alcohol, preferably an ethoxylated nonylphenol, is slowly added dropwise to complete the preparation. This surfactant is added in an amount sufficient to provide for rapid release of the polymer from the inverse emulsion during intended end use of the emulsion for water treatment.

Once the emulsifier has been added, the inverse emulsion is ready for use, and has a viscosity generally within the range of about 100 to 600 cps, with the viscosity typically being in the range of about 100–300 pcs. Emulsions with appreciably higher viscosities may be undesirable because of pumping and handling problems attendant with excessively viscous liquids.

A complex reaction occurs during polymerization. The complexity of the reaction is evidenced by variability in the percentage of DADMAC incorporation depending upon various factors such as the reaction temperature profile and the concentration of the initiator, for example, applications of the inverse emulsion polymers of the present invention will include utility in coagulation, flocculation and dewatering of municipal sludges and chemical waste sludges.

In the following examples of the present invention and throughout this description and the claims set forth below, all parts and percentages are weight percent and procedures are carried out at ambient temperature and pressure, unless otherwise specified.

EXAMPLE 1

An inverse emulsion terpolymer of diallyldimethylammonium chloride is prepared by mixing an isoparaffinic oil (150 g) available commercially as Chevron Thinner 450 with emulsifiers that provided an HLB of 5.5. The emulsifiers comprised (a) a mixture of sorbitan monooleate and ethoxylated 12-hydroxystearic acid (14.35 g), and (b) a mixture of sorbitan trioleate and ethyoxylated 12-hydroxystearic acid (3.15 g). The resulting oil phase is emulsified using a mixer of the kind conventionally used in preparing emulsion polymers.

The emulsified oil phase is mixed with a solution of 50% commercially available gaseous acrylamide (266.1 g) combined with DADMAC (5.1 g; 62% in water), and with 2-methacryloylethyltrimethyl ammonium chloride (21.8 g; 75% in water). The resulting mixture is emulsified until most of the droplets are between 1 and 3 microns in size.

The resulting water-in-oil emulsion is charged into a 1-liter glass-jacketed resin kettle equipped with a paddle stirrer, nitrogen sparger and thermometer. The emulsion is sparged with nitrogen for 0.5 hours to remove oxygen. Water at 45° C. +/− 1° C. is circulated through the reactor jacket to maintain the reaction temperature. The system is designed to allow circulation of cooling water in the event of an exotherm. 70 Mg of a polymerization initiator, t-butylperoxypivalate is added. The polymerization proceeds for 8 hours at 45° C. Then 2.4 wt. % of an ethoxylated nonylphenol emulsifier containing 9.5 ethoxy units and having an HLB of 13.4, is slowly added dropwise to complete the preparation.

The resulting emulsion has a Brookfield viscosity of 200 cps. The residual DADMAC monomer content is zero, corresponding to a conversion of 100%.

The stability of the product was a trace of oil and no cream after 30 days at 50° C.

EXAMPLE 2

A polymer was prepared in accordance with the procedure used and described in Example 1 except that:
a. 2-acryloylethyltrimethylammonium chloride (DAEM-Q) is substituted for 2-methylacryloylethyltrimethylammonium chloride (DMAEM-Q);
b. the index ratio of DAEM-Q to DADMAC is 1 to 4;
c. the total monomer is 35.8 weight %; and
d. the temperature was varied from 40° C. for 4 hrs., 50° C. for 1 hr, and finally 60° C. for 1 hr.

The viscosity of the emulsion was 200 cps.

The stability of the product was no oil or cream after 33 days at 50° C.

The incorporation of DADMAC was 93% versus an expected incorporation of about 40% if no DMAE-Q was present.

EXAMPLE 3

A series of emulsions were made according to the procedure described in Example 1 with slight modifications in temperature and with compositions as indicated in the following table of data where the effect of adding DMAEM-Q is demonstrated over a range of total cationic monomer.

|  | EFFECT OF DMAEM-Q MOLE % OF MONOMERS | | | |
| --- | --- | --- | --- | --- |
|  | ACRYLAMIDE | DADMAC[A] | DMAEM-Q[B] | % DADMAC INCORPORATED |
| Low Total | 92 | 8 | 0 | 40 |
| Cationic | 92 | 7 | 1 | 63 |
| Monomer | 90 | 5 | 5 | 100 |
| Medium Total | 80 | 20 | 0 | 47 |
| Cationic | 80 | 19 | 1 | 80 |
| Monomer | 80 | 18 | 2 | 77 |
| High Total | 60 | 40 | 0 | 38 |
| Cationic Monomer | 60 | 39 | 1 | 82 |

[A]Diallyldimethylammonium chloride
[B]2-methacryloylethyltrimethylammonium chloride

What is claimed:

1. A process for enhancing the incorporation of diallyldimethylammonium chloride into an acrylamide polymer, said process comprising forming a polymerizable mixture in an aqueous system of diallyldimethylammonium chloride and acrylamide in the presence of emulsifiers, introducing into the polymerizable mixture a polymerizable promoter monomer having a higher reactivity with acrylamide than diallyldimethylammonium chloride, and polymerizing said promoter containing polymerizable mixture, said polymerizable promoter monomer being present in an amount sufficient to provide improved incorporation of diallyldimethylammonium chloride into the acrylamide polymer and being

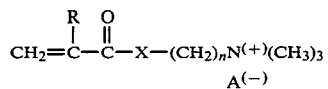

wherein

R is —H or $CH_3$;

X is —O—, or —NH—;

n has a value of 2–4; and

A is an ion selected from the group consisting of $Cl^-$, $CH_3SO_4^-$ $HSO_4^-$ and $NO_3^-$.

2. The process of claim 1 wherein said promoter monomer comprises 2-methacryloylmethyltrimethylammonium chloride.

3. The process of claim 1, wherein said promoter monomer comprises 2-acryloylethyltrimethylammonium chloride.

4. The process of claim 1, wherein the polymerization is carried out at a temperature in the range of about 35°–55° C.

5. The process of claim 4, wherein said temperature is in the range of about 40°–45° C.

6. The process of claim 1, wherein the polymerization is effected in an emulsion.

7. The process of claim 6, wherein emulsifiers employed in the system are a mixture of sorbitan monooleate and ethoxylated 12-hydroxystearic acid, and a mixture of sorbitan trioleate and ethoxylated 12-hydroxystearic acid.

* * * * *